(12) United States Patent
Wilhelm et al.

(10) Patent No.: US 7,850,561 B2
(45) Date of Patent: Dec. 14, 2010

(54) TENSIONING DEVICE FOR A TRACTION ELEMENT DRIVE WITH AN IMPROVED AXIAL-BEARING ARRANGEMENT

(75) Inventors: Manfred Wilhelm, Gerhardshofen (DE); Horst Adel, Rochester Hills, MI (US); Scott Ribey, Port Elgin (CA); Fred Seebeck, Royal Oak, MI (US); Scott Thompson, Warren, MI (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 191 days.

(21) Appl. No.: 11/945,298

(22) Filed: Nov. 27, 2007

(65) Prior Publication Data

US 2008/0125260 A1 May 29, 2008

Related U.S. Application Data

(60) Provisional application No. 60/867,205, filed on Nov. 27, 2006.

(51) Int. Cl.
*F16H 7/10* (2006.01)
*F16H 7/12* (2006.01)
*F16H 7/14* (2006.01)

(52) U.S. Cl. .................. 474/135; 474/112; 474/117

(58) Field of Classification Search ............ 474/135, 474/133, 112, 101, 109, 113–117
See application file for complete search history.

(56) References Cited

U.S. PATENT DOCUMENTS

| | | | |
|---|---|---|---|
| 5,236,396 A * | 8/1993 | Golovatai-Schmidt et al. ............... 474/101 |
| 5,772,549 A * | 6/1998 | Berndt et al. ............... 474/135 |
| 5,795,257 A * | 8/1998 | Giese et al. ............... 474/109 |
| 6,592,482 B2 * | 7/2003 | Serkh ............... 474/135 |
| 6,767,303 B2 * | 7/2004 | Ayukawa ............... 474/135 |
| 6,863,631 B2 * | 3/2005 | Meckstroth et al. ......... 474/135 |
| 2005/0146127 A1* | 7/2005 | Schonmeier et al. ........ 280/806 |
| 2005/0181902 A1* | 8/2005 | Konanz ............... 474/135 |

FOREIGN PATENT DOCUMENTS

DE 4343429 6/1995
DE 4431801 3/1996

* cited by examiner

*Primary Examiner*—Michael R Mansen
*Assistant Examiner*—Henry Liu
(74) *Attorney, Agent, or Firm*—Volpe and Koenig, P.C.

(57) ABSTRACT

Tensioning device (1) for a traction element drive, such as a belt or chain drive, with a tensioning arm (4), which can pivot relative to a body (2) about a pivot axle (3) and on whose distal end a roller (5) supported rotatably is arranged for tensioning the traction element, for the purpose of which there is a torsion spring (6) acting between the pivot axle (3) of the tensioning arm (4) and the body (2), and the pivot axle (3) is supported so that it can slide by at least one radial-bearing arrangement (7) and at least one axial-bearing arrangement (8), wherein the axial-bearing arrangement (8) comprises a friction disk (9) arranged concentric to the pivot axle (3), wherein the friction disk (9) has an axial stop surface (11), which comprises at least one radial circumferential key groove (12) and that at least one radial circumferential friction spring, which extends into the key groove (12), is constructed in the surface adjacent to the stop surface (11) of the friction disk (9).

10 Claims, 2 Drawing Sheets

TENSIONING DEVICE FOR A TRACTION ELEMENT DRIVE WITH AN IMPROVED AXIAL-BEARING ARRANGEMENT

CROSS-REFERENCE TO RELATED APPLICATION

This application claims the benefit of U.S. Provisional Application 60/867,205, filed Nov. 27, 2006, which is incorporated herein by reference as if fully set forth.

BACKGROUND

The present invention relates to a tensioning device for a traction element drive, such as a belt or chain drive, with a tensioning arm, which can pivot relative to a body about a pivot axle and on whose distal end a roller is rotatably supported for tensioning the traction element, by means of which a torsion spring acting between the pivot axle of the tensioning arm and the body is provided and the pivot axle is supported so that it can slide by at least one radial-bearing arrangement and at least one axial-bearing arrangement, wherein the axial-bearing arrangement comprises a friction disk arranged concentric to the pivot axle.

Tensioning devices of the type of interest here are used, in particular, for tensioning traction element drives arranged between the crankshaft and the camshaft of an internal combustion engine. The tensioning devices are exposed to considerable dynamic loading, wherein an essential goal in constructing such tensioning devices is to implement the tensioning arm that can rotate about the pivot axle so that it is not sensitive to vibrations. Therefore, according to the state of the art, friction-bearing arrangements are known, which damp or absorb the vibrations introduced into the tensioning arm via the roller supported so that it can rotate. The axial-bearing arrangement is therefore used, in particular, as a friction mechanism.

From the laid-open, unexamined application DE 44 31 801 A1, a tensioning device for traction element drives, such as belts or chains, is known. This device is comprised of a tensioning arm, which is supported rotatably and spring mounted via a torsion spring against the traction element. Tensioning means, in particular in the form of a rotatably supported roller, are tensioned by this tensioning arm. Furthermore, at least one friction element is provided between two flanges, of which one is fixed to the tensioning arm and the other is fixed to the housing. One radial flange is provided on the end with wedge-shaped ramps following one after the other in the circumferential direction, wherein a friction disk, which is arranged between the radial flanges and which can rotate relative to these two radial flanges, is provided with counter ramps that are parallel to the first ramps and thus interact with them. Thus, as a result of the wedge effect, due to a rotation of the ramps relative to each other, the tensioning pressure between the radial flanges is increased against the torsion spring, but the friction surfaces of each ramp are exposed to considerable surface pressure and are therefore subjected to significant wear. The cause of the wear lies especially in that the pressure-force component of the torsion spring presses the ramps approximately flat against each other and pressure forces caused by the compression of the torsion spring are even increased.

From Patent No. DE 43 43 429 C2, a tensioning device for a belt or chain drive is known with a tensioning arm, which carries on its end a tensioning roller and which is supported rotatably on its other end by a shaft in a housing and which is spring mounted on the housing by a torsion spring. The tensioning device disclosed here is further constructed with a friction disk locked in rotation with the shaft or the tensioning arm, between whose friction surface and an axial contact surface of the housing there is a friction lining, wherein the contact surface of the housing has a plurality of sharp-edged projections, which extend in the axial direction and which dig into the friction lining under axial pressure. In this way it is guaranteed that the friction lining is fixed in a given position on the contact surface, so that the friction work can take place only between the friction disk and the friction lining. However, according to the construction disclosed here, the friction disk has a flat contact surface running against the housing of the tensioning device. During long operation of the tensioning device, a relatively smooth friction surface is formed, so that the friction resistance that can be generated in the rotational movement of the tensioning arm has only very small values. Satisfactory damping of introduced vibrations in the tensioning arm cannot be achieved over a long operating period.

SUMMARY

In view of the background of the state of the art discussed above, the object of the present invention is to create a tensioning device for a traction element drive, which causes a large friction moment in the rotational movement of the tensioning arm for a simple construction of the axial-bearing arrangement. In particular, the task of the present invention is to create an axial-bearing arrangement, which allows low-wear operation over a long period of use and guarantees optimum vibration damping of the rotational movement of the tensioning arm about the pivot axle.

This object is met starting with a tensioning device according to invention. The following description and claims give advantageous improvements of the invention.

The invention therefore includes the technical teaching that the friction disk has an axial stop surface, which comprises at least one radial circumferential key groove and that in the surface bordering the stop surface of the friction disk there is at least one radial circumferential friction spring, which extends into the key groove.

The advantage of the solution according to the invention is to be seen in that a wedge effect is created, which increases the surface pressure between the surface of the key groove and the friction spring. If the stop surface is loaded axially, for example, by an axial-force component of the torsion spring, then the friction spring is pressed into the key groove. Due to the angled arrangement of the contact surfaces, the normal force onto the corresponding surface increases, because the normal force is comprised of a vertical component and a horizontal component. The friction disk can be constructed as an individual part and as a disk or ring between the hub section of the tensioning arm and a stop disk closed on the outside. The circumferential key groove extends over the entire periphery of the friction disk, so that the friction spring allocated to each key groove also extends like a ring into the key grooves. The friction springs can have a trapezoidal cross section, which is to be understood as a type of wedge with a shortened head. If the axial stop surface of the friction disk contacts the opposing surface with the circumferential friction springs, then the friction disk is supported only against the friction springs or against their lateral flanks. Only then can the normal-force components in the flanks of the friction springs be increased.

According to another advantageous embodiment of the present invention, it is provided that the friction disks 1 to 10, preferably 2 to 5, and especially preferred 3, comprise key grooves arranged concentric to each other, in which a radial circumferential friction spring extends from the adjacent surface. Three key grooves formed concentric to each other and the associated friction springs has proven to be the optimum number, because for a single key groove the necessary installation space is greatly increased and the achievable surface pressures are relatively small. In any case, the invention is not limited to a number of preferably three key grooves, but instead there can also be a plurality of grooves, which extend concentrically over the entire surface of the stop surface of the friction disk. Thus, it is also not excluded that the stop surface of the friction disk comprises 10, 20, 30 and more key grooves arranged concentrically. The key grooves in the friction disk here have a wedge-shaped cross section, wherein friction springs extending into the grooves are adapted to the wedge shape of the key grooves. However, it is also conceivable that the key grooves have semicircular inner contours and the friction springs each have semicircular outer contours constructed as a negative to the contours of the key grooves.

Advantageously, the one or more key grooves have a wedge angle $\alpha$, which involves a value of 10°-60°, preferably 20°-45°, and especially preferred 30°. Tests have shows that a wedge angle $\alpha$ with a value of approximately 30° represents an optimum for the resulting normal force component. The achievable increase in surface area by the given angle can also be given, for example, with a factor of 4. With respect to the stop surface of the friction disk, this can border the surface of the tensioning arm and the one or more friction springs are formed in the surface of the tensioning arm. Alternatively, there is the possibility that the stop surface of the friction disk borders the stop disk and one or more friction springs are formed in the surface of the stop disk. The stop disk is locked in rotation and in the axial direction on the pivot axle and does not rotate with the tensioning arm. If the tensioning arm and the hub formed on this arm around the pivot axle are made from an aluminum die-cast component or a plastic injection-molded component, the friction springs can be formed on the tensioning arm using injection molding on the side of the hub section of the tensioning arm. According to the latter embodiment, if the friction springs are formed on the side of the stop disk, then these can be produced, for example, by a cutting process.

According to another advantageous embodiment of the present invention, the friction disk is made from a plastic material comprising a PTFE material, an organic plastic, or a polyamide. It can be further provided that the friction disk and also the stop disk are made from a PTFE-containing polyamide, an aluminum material, or a steel material. The tensioning arm can be made both from an aluminum die-casting material and also from a plastic injection molding material, wherein an advantageous embodiment provides that the tensioning arm comprises an aluminum die-casting material, wherein the friction disk features a plastic material and the stop disk is made from an aluminum material.

Advantageously, it can be further provided that the friction disk has a friction coating comprising a PTFE coating on at least the side of the stop surface. The PTFE coating, however, can be formed both on the side of the stop disk and also on the side of the hub section of the tensioning arm.

According to an alternative embodiment of the friction disk, these have multiple-part constructions and the parts forming the friction disks are connected to each other by compensating elements. The compensating elements extend in the radial direction between the corresponding parts of the friction disk and connect these to each other elastically. The individual annular parts of the friction disk are arranged concentric to each other, so that positioning errors can be compensated by the elastic connection and a uniform torsion moment or a torsion moment increasing uniformly is produced by means of the oscillating movement of the tensioning arm. The elastic construction of the friction disk has a further wear-reducing effect through the division into concentrically arranged individual parts and the corresponding connection of the individual parts by the compensating elements and production-related tolerances can be compensated in a simple way.

BRIEF DESCRIPTION OF THE DRAWINGS

Additional measures improving the invention are shown in more detail below together with the description of preferred embodiments of the invention with reference to the figures.

Shown are.

DETAILED DESCRIPTION OF THE PREFERRED EMBODIMENTS

Figure 1:
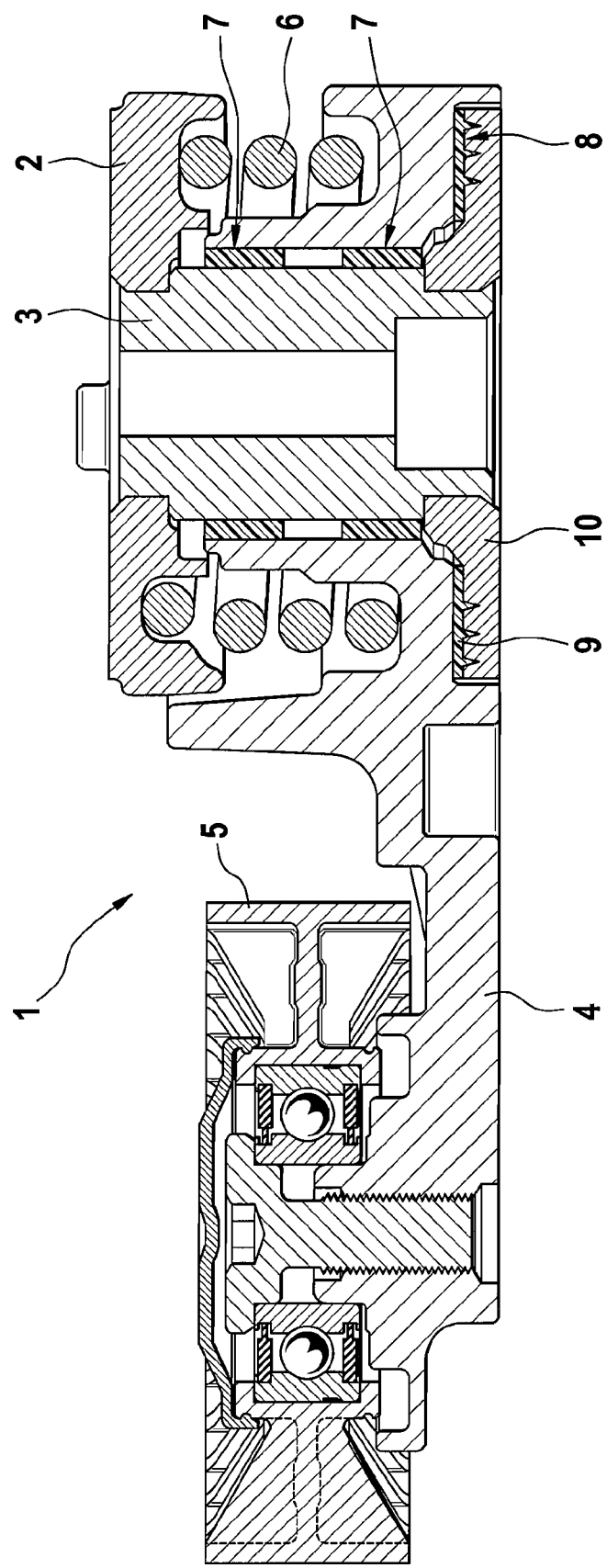
FIG. 1 a cross-sectional side view of the tensioning device with an axial-bearing arrangement according to the present invention, wherein a friction disk is arranged between a stop disk and hub section of a tensioning arm.

In FIG. 1, a tensioning device 1 according to the invention is shown in a cross-sectional side view. The tensioning device 1 comprises first a body 2, which is connected integrally to a pivot axle 3 and can be flange mounted, for example, to an internal combustion engine. As a whole, the body 2, the pivot axle 3, and also a stop disk 10 connected rigidly to the pivot axle 3 are arranged to be stationary, wherein a tensioning arm 4 can execute a rotational motion about the pivot axle 3. The tensioning arm 4 is arranged concentrically about the pivot axle 3, wherein the bearing comprises a radial bearing arrangement 7 and also an axial bearing arrangement 8. Between the tensioning arm 4 or its hub section and also the body 2 there is a torsion spring 6, which tensions a roller 5 supported rotatably on the distal end of the tensioning arm 4 against the traction element—not shown here—such as a belt or a chain. The roller 5 is preloaded permanently against the traction element via the moment-force of tensioning arm 4, so that vibrations can be introduced into the entire system of the tensioning device 1 via the traction element. To damp these vibrations, the axial-bearing arrangement is formed as a friction bearing. The radial-bearing arrangement 7, which, according to the present embodiment, is composed of two sub-sections extending past the pivot axle 3 in the longitudinal direction, can also generate friction between the rotating tensioning arm 4 and the pivot axle 3.

Figure 2:
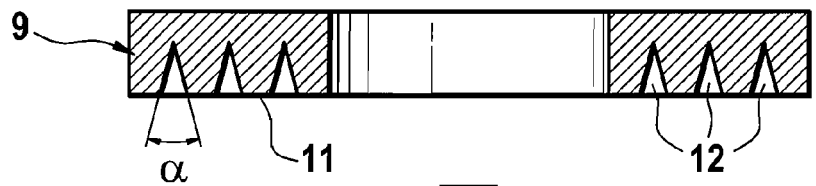
FIG. 2 a cross-sectional side view of the friction disk according to the invention, in which three key grooves constructed concentric to each other are formed.

FIG. 2 shows a cross-sectional side view of the friction disk 9, which comprises a stop surface 11, which contacts, for example, the stop disk—not shown here. In the stop surface 11 of the friction disk 9, three key grooves 12 are formed concentric to each other. The key grooves 12 have a wedge angle $\alpha$ that can have, for example, a value of 30°. Now, in the key grooves 12, friction springs can extend, which are formed in the surface opposite the stop surface 11 in the installed state of the friction disk 9.

Figure 3:
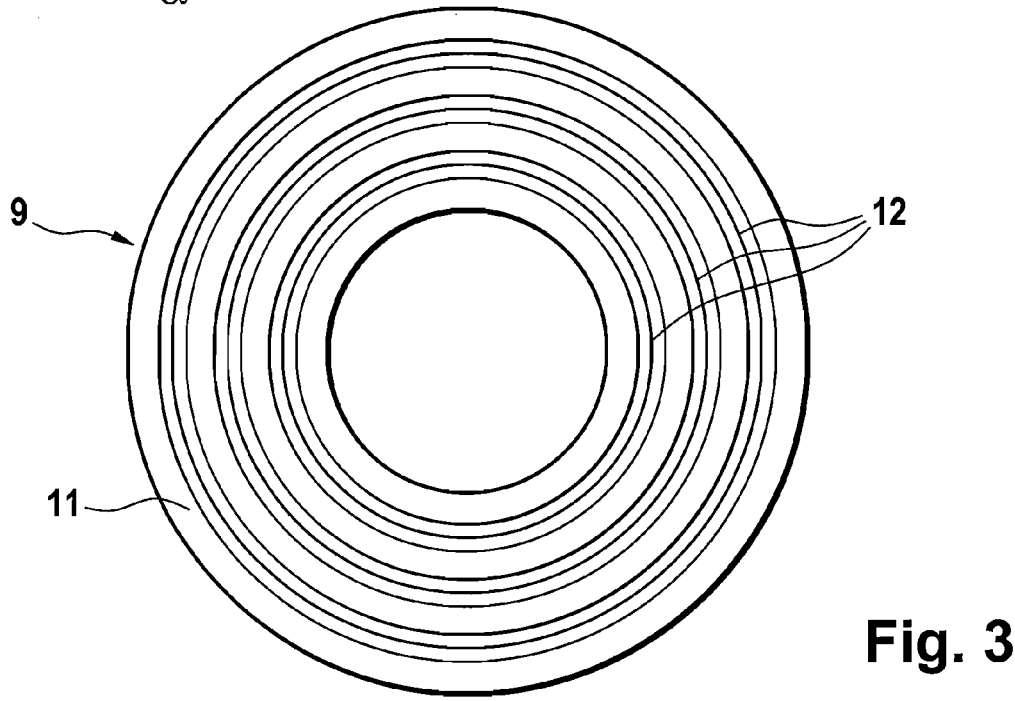
FIG. 3 a plan view of the friction disk according to the invention according to FIG. 2.

FIG. 3 shows a plan view of the friction disk 9 according to the invention, wherein it can be seen that the key grooves 12 extend around the entire circumference of the friction 9 concentric to each other. The stop surface 11 is thus interrupted by the key grooves 12, wherein the stop surface 11 does not contact the opposite surface in the installed state of the friction disk 9, but instead the non-positive connection is realized by friction springs, which extend into the key grooves 12.

Figure 4:
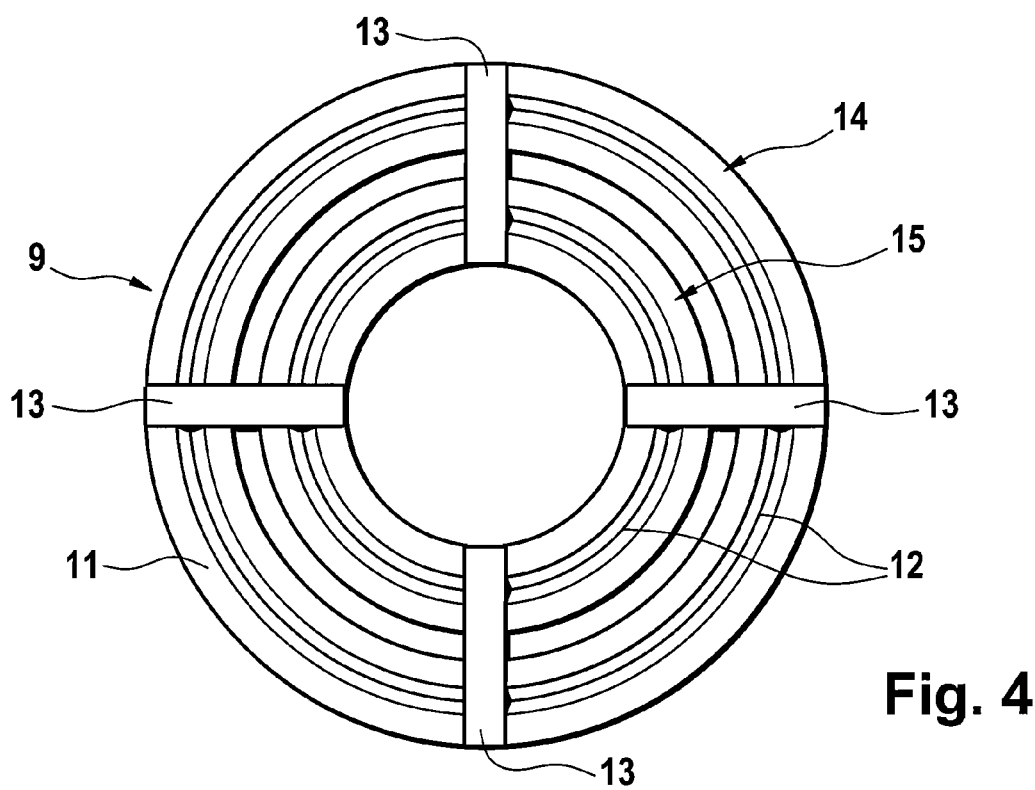
FIG. 4 a plan view of another embodiment of the friction disk according to the invention.

FIG. 4 shows another embodiment of a friction disk 9 according to the present invention, wherein the friction disk 9 has a multiple-part construction. According to the representation, the friction disk 9 comprises an outer part 14 and also an inner part 15, wherein both the outer part 14 and also the inner part 15 each comprises exactly one key groove 12. The two parts 14 and 15 are connected to each other using compensating elements 13, which comprise an elastic material and can compensate alignment and/or positioning errors within the friction springs of the adjacent component or the friction disk 9. The compensating elements 13 are arranged in the radial direction and constructed, for example, in the form of round or rectangular connecting pieces. There is the further possibility that the friction disk 9 is constructed overall as an injection-molded component, so that the compensating elements 13 are injection molded as integral injection-molded section by means of the outer part 14 and the inner part 15.

The invention is not restricted in its construction to the preferred embodiment specified above. Instead, a number of variants are conceivable, which use the described solution also for fundamentally different types of constructions.

LIST OF REFERENCE SYMBOLS

Tensioning device
2 Body
3 Pivot axle
4 Tensioning arm
5 Roller
6 Torsion spring
7 Radial-bearing arrangement
8 Axial-bearing arrangement
9 Friction disk
10 Stop disk
11 Stop surface
12 Key groove
13 Compensating element
14 Outer part
15 Inner part
α Wedge angle

The invention claimed is:

1. Tensioning device for a traction element drive, comprising a tensioning arm, which can pivot relative to a body about a pivot axle and having a roller on a distal end thereof that is supported rotatably, a torsion spring is provided between the pivot axle of the tensioning arm and the body for tensioning the traction element, and the tensioning arm is slidably supported on the pivot axle via at least one radial-bearing arrangement and at least one axial-bearing arrangement, the axial-bearing arrangement comprises a friction disk arranged concentric to the pivot axle, the friction disk has an axial stop surface which comprises at least one radial circumferential key groove; and at least one radial circumferential friction spring having an outer diameter substantially equal to the friction disk and which extends into the key groove, is provided on a surface adjacent to the stop surface of the friction disk, the friction disk has a multiple-part construction comprising two rings arranged concentric to each other, and the rings are connected to each other by compensating elements that extend in a radial direction between the rings and connect the rings to each other elastically.

2. Tensioning device according to claim 1, wherein the at least one radial circumferential key groove comprises 1 to 10 key grooves arranged concentric to each other, and the at least one radial circumferential friction spring comprises a corresponding number of radial circumferential friction springs which each extend from the adjacent surface and into a respective one of the grooves.

3. Tensioning device according to claim 2, wherein the key grooves in the friction disk comprise a wedge-shaped cross section, the friction springs extending into the grooves are shaped complementary to the wedge shape of the key grooves.

4. Tensioning device according to claim 1, wherein the at least one key groove has a wedge angle (α), which has a value of 10° to 60°.

5. Tensioning device according to claim 4, wherein the at least one key groove has a wedge angle (α), which has a value of about 30°.

6. Tensioning device according to claim 1, wherein the stop surface of the friction disk is adjacent to a stop disk, and the at least one friction spring is formed on a surface of the stop disk.

7. Tensioning device according to claim 1, wherein the friction disk is produced from a plastic material comprising a PTFE material, an organic plastic, a polyamide or a PTFE-containing polyamide.

8. Tensioning device according to claim 1, wherein the friction disk has a friction coating comprising a PTFE coating at least on a side of the stop surface.

9. Tensioning device for a traction element drive, comprising a tensioning arm, which can pivot relative to a body about a pivot axle and having a roller on a distal end thereof that is supported rotatably, a torsion spring is provided between the pivot axle of the tensioning arm and the body for tensioning the traction element, and the tensioning arm is slidably supported on the pivot axle via at least one radial-bearing arrangement and at least one axial-bearing arrangement, the axial-bearing arrangement comprises a friction disk arranged concentric to the pivot axle, the friction disk has an axial stop surface which comprises at least one radial circumferential key groove; and at least one radial circumferential friction spring which extends into the key groove, is provided on a surface adjacent to the stop surface of the friction disk, the friction disk has a multiple-part construction comprising two rings arranged concentric to each other, and the rings are connected to each other by compensating elements that extend in a radial direction between the rings and connect the rings to each other elastically, the at least one radial circumferential key groove comprises 3 key grooves arranged concentric to each other, and the at least one radial circumferential friction spring comprises a corresponding number of radial circumferential friction springs which each extend from the adjacent surface and into a respective one of the grooves.

10. Tensioning device for a traction element drive, comprising a tensioning arm, which can pivot relative to a body about a pivot axle and having a roller on a distal end thereof that is supported rotatably, a torsion spring is provided between the pivot axle of the tensioning arm and the body for tensioning the traction element, and the tensioning arm is slidably supported on the pivot axle via at least one radial-bearing arrangement and at least one axial-bearing arrangement, the axial-bearing arrangement comprises a friction disk arranged concentric to the pivot axle, the friction disk has an axial stop surface which comprises at least one radial circumferential key groove; and at least one radial circumferential friction spring which extends into the key groove, is provided on a surface adjacent to the stop surface of the friction disk, the friction disk has a multiple-part construction comprising two rings arranged concentric to each other, and the rings are connected to each other by compensating elements that extend in a radial direction between the rings and connect the rings to each other elastically, and only one of the key grooves is located in each of the rings.

* * * * *